United States Patent
Pellenc et al.

(10) Patent No.: US 10,697,527 B2
(45) Date of Patent: Jun. 30, 2020

(54) BALL-SCREW AND NUT MECHANISM

(71) Applicant: PELLENC (Societe Anonyme), Pertuis (FR)

(72) Inventors: Roger Pellenc, Pertuis (FR); Philippe Gilbert, La Puy Sainte Repararde (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 303 days.

(21) Appl. No.: 15/513,273

(22) PCT Filed: Nov. 3, 2015

(86) PCT No.: PCT/FR2015/052961
§ 371 (c)(1),
(2) Date: Mar. 22, 2017

(87) PCT Pub. No.: WO2016/083692
PCT Pub. Date: Jun. 2, 2016

(65) Prior Publication Data
US 2017/0241525 A1    Aug. 24, 2017

(30) Foreign Application Priority Data

Nov. 25, 2014 (FR) ..................................... 14 61401

(51) Int. Cl.
*F16H 25/22* (2006.01)
*A01G 3/037* (2006.01)
*F16H 25/20* (2006.01)

(52) U.S. Cl.
CPC ......... *F16H 25/2223* (2013.01); *A01G 3/037* (2013.01); *F16H 2025/2043* (2013.01); *F16H 2025/2075* (2013.01)

(58) Field of Classification Search
CPC ............. F16H 25/2223; F16H 25/2214; F16H 25/2219

(Continued)

(56) References Cited

U.S. PATENT DOCUMENTS 5,005,436 A * 4/1991 Brusasco ............ F16H 25/2223
74/424.87
5,094,119 A * 3/1992 Virga .................. F16H 25/2209
74/89.42

(Continued)

FOREIGN PATENT DOCUMENTS

DE    102006055300 A1 * 6/2007 ........... B62D 5/0448
DE    102012222835 A1 * 6/2014 ......... F16H 25/2223

(Continued)

OTHER PUBLICATIONS

International Search Report for corresponding International Application No. PCT/FR2015/052961.

*Primary Examiner* — Jake Cook
*Assistant Examiner* — Gregory Robert Weber
(74) *Attorney, Agent, or Firm* — Egbert Law Offices, PLLC

(57) ABSTRACT

A ball screw and nut mechanism has a screw in cooperation with a nut via balls that can circulate in a raceway formed by the opposing threads of the screw and nut. The nut has a recirculation insert passing therethrough from the outer face to the thread, the recirculation insert having a first end with a ball transfer groove turned towards the screw. The mechanism has a holding body for holding the recirculation insert in the housing, the recirculation insert having a second end with a shoulder bearing on the nut, the second end of the recirculation insert having an orientation lug having an angular position predetermined and fixed relative to the ball transfer groove, the orientation lug cooperating with a guide relief of the holding body to fix an orientation of the recirculation insert such that the transfer groove is adjusted to the raceway.

15 Claims, 6 Drawing Sheets

(58) Field of Classification Search
USPC .................................................. 74/424.87
See application file for complete search history.

(56) References Cited

U.S. PATENT DOCUMENTS

| | | | | | |
|---|---|---|---|---|---|
| 5,711,188 | A | * | 1/1998 | Miyaguchi | F16H 25/2223 74/424.87 |
| 6,439,338 | B2 | * | 8/2002 | Yoshioka | B62D 5/0448 180/444 |
| 8,544,356 | B2 | * | 10/2013 | Asakura | F16H 25/2214 180/444 |
| 2004/0045388 | A1 | * | 3/2004 | Sugita | F16H 25/2223 74/424.87 |
| 2006/0169079 | A1 | * | 8/2006 | Lee | F16H 25/2233 74/424.82 |
| 2010/0242651 | A1 | * | 9/2010 | Shirai | F16H 25/2214 74/424.83 |
| 2012/0266702 | A1 | * | 10/2012 | Allegri | F16H 25/2214 74/89.34 |
| 2013/0068058 | A1 | * | 3/2013 | Allegri | F16H 25/2219 74/424.87 |
| 2014/0260746 | A1 | * | 9/2014 | Sakaguchi | F16H 25/2214 74/424.81 |
| 2015/0027258 | A1 | * | 1/2015 | Koyagi | F16H 25/2214 74/424.87 |

FOREIGN PATENT DOCUMENTS

| | | | | | |
|---|---|---|---|---|---|
| DE | 102013207745 | A1 | * | 10/2014 | ......... F16H 25/2223 |
| DE | 102013226712 | A1 | * | 6/2015 | ......... F16H 25/2214 |
| DE | 102016223233 | A1 | * | 5/2018 | ......... F16H 25/2214 |
| FR | 2550300 | A1 | | 2/1985 | |
| FR | 2624417 | A1 | | 6/1989 | |
| GB | 879462 | A | | 10/1961 | |
| JP | H07-174205 | A | * | 7/1995 | ........... B62D 5/0448 |
| JP | 2003343682 | A | * | 12/2003 | ......... F16H 25/2223 |
| JP | 2010060100 | A | * | 3/2010 | ......... F16H 25/2214 |
| JP | 5051075 | B2 | * | 10/2012 | ......... F16H 25/2214 |
| JP | 2012225485 | A | | 11/2012 | |
| JP | 2014156902 | A | * | 8/2014 | ........... B62D 5/0448 |
| JP | 2014156902 | A | | 8/2014 | |

* cited by examiner

BALL-SCREW AND NUT MECHANISM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a ball screw-nut mechanism and in particular to such a mechanism, of reduced dimensions and weight, suitable for use in portable power tools, such as electric pruning scissors and electric shears, for example. The invention can also find applications in the field of machine-tools, aeronautics, actuators, and more generally in any type of mechanical device requiring a transformation from a rotary movement into a translational motion or the other way around.

2. Description of Related Art Including Information Disclosed Under 37 CFR 1.97 and 37 CFR 1.98

Systems for transforming a rotary movement into a translational movement, or a circular movement into a linear movement, often use ball screw and nut devices which allow transformation of movements with very high efficiency. They are generally constituted by a screw with helical thread with circular or ogival profile, by a nut including a thread with the same type of profile, and by balls of a calibrated diameter circulating in a raceway constituted by the conjunction of the thread of the screw and that of the nut, in which the balls transmit the stress between the screw and the nut, without virtually any friction.

One of the problems to be resolved for these devices is the recycling of the balls in the raceway. As a matter of fact, when the screw turns in relation to the nut, the balls advance in their raceway. To prevent the balls from leaving the space between the screw and the nut during the operation, they are brought back to their starting point by a recycling device after having run for one or several successive revolutions in the raceway. This recycling device incorporates a portion of complementary path of the balls called from now on the transfer groove, which pushes the balls out of their raceway to force them to circulate above the outer diameter of the screw and then rejoin the raceway in a cyclical path thus preventing them from escaping the hold between the screw and the nut. The transfer groove takes the shape of a channel to guide the path of the balls, this channel being possibly of a tubular shape thus completely surrounding the balls around their path. In the transfer groove of the recycling device, the balls do not participate in the stress transmission between the screw and the nut. The path followed by the balls while the screw-nut system is functioning is thus a closed path constituted by a spiral raceway with one or more revolutions and completed by the transfer groove of the recycling device. Several raceways can thus be defined by a same ball screw-nut system, requiring the same number of recycling devices.

The new generations of ball screw-nut systems prefer recycling devices with one revolution, thus limiting the number of balls which do not contribute to the load transmitted between the screw and the nut, as well as the complexity of manufacturing the complementary transfer groove in each raceway, and thereby the cost of the device. These ball screw-nut systems and with single revolution recycling also limit the risk of failure due to balls being blocked in the recycling device. In effect, the recycling devices over several revolutions feature long transfer grooves that are complex to produce, by incorporating for example tubular parts for transporting the balls above the intermediary revolutions of the ball raceway, so as not to disturb their circulation in the raceway constituted by these intermediary revolutions. Now, these conduits can easily be obstructed by dust or debris transported by the balls and agglomerated with any lubricants present in the screw-nut system.

The recycling devices generally include recirculation inserts made of plastic material or a low friction metal alloy and positioned in a groove made in the nut between its external and its internal surfaces. These recirculation inserts each integrate a transfer groove to a first end situated near the nut threads to complete the ball race.

The main problem therefore lies in the attachment of the inserts constituting the recycling device. There are two categories of recycling devices that address this problem: recycling devices with assembly inside the nut and the recycling devices with assembly outside the nut.

A recycling device with assembly inside the nut is described, for instance, in the document FR2703122. The recirculation insert of this recycling device is positioned in its bearing housing inside the nut. It has two tabs that seat themselves on either side of its bearing housing inside the nut when they return to the race at the contact of the nut, said tabs ensuring, in this position, the proper functioning of the transfer groove in continuity with the ball race by locking the orientation and axial positioning of the recirculation insert. One difficulty likely to occur with such a recycling device is however connected to the assembly of the parts, in particular with nuts of small diameter and considerable length. In fact, every recirculation insert, together with its positioning tooling, must be able to penetrate into the threaded hole of the nut before being positioned opposite its bearing housing where it is to be inserted with precise orientation. This operation requires complex tooling, and may turn out to be impossible, just because the diameter of the threaded hole is of a small size, for example smaller than the size of a finger.

A recycling device with outside assembly is described, for example, in the document FR2045496. It does not present the afore-mentioned assembly difficulties. However, here the manufacture of bearing housings in the nut with an elliptic shape to solidify the orientation of the transfer groove is delicate and onerous to produce.

A recycling device with exterior assembly is also described in the document EP0957294. But this device does require a special tool for introducing the recirculation inserts and these are not maintained by the exterior of the nut to compensate the stress forces generated in the axis of the bearing housing on the recirculation insert as the balls pass into the transfer groove. In case of a significant load supported by the screw-nut system, the balls generate steadily growing forces in this axis. If these forces are insufficiently taken up by the size of the tabs, these risk becoming disengaged from their bearing housing or creating deformations of the transfer groove, which is detrimental to the efficiency of the screw-nut system. The size of the tabs is furthermore limited by the installation method of the insert, limiting in fact the holding stress the insert is able to bear in its housing.

Thus, in these ball screw-nut systems, the recirculation inserts are generally maintained in the nut housing by means such as glue, a lock screw, a ring made of plastics or something else and lock the orientation of the transfer groove by complex combined shapes of the recirculation insert in combination with the complementary shape of its housing. These means increase the complexity of implementing not only the nut housings but also that of the recirculating inserts and their holding device.

BRIEF SUMMARY OF THE INVENTION

The invention aims to attain the advantages of the various solutions presented above, while simplifying the machining of the nut and reducing the assembly time of the screw-nut assembly. The invention also aims to ensure simple and precise holding and orientation of each transfer groove even in cases of significant stress transmitted by the screw-nut system without notable degradation of the efficiency of said system.

To attain these aims the invention proposes a ball screw and nut mechanism which includes:

a screw and a threaded nut, the nut cooperating with the screw through the intermediary of balls capable of circulating in a raceway formed by the threads of the screw and the facing nut, the nut being furthermore provided with at least one recirculation insert inserted from an exterior face of the nut, into at least one cylindrical housing, traversing the nut from the external face of the nut up to the thread of the nut, the recirculation insert presenting a first end with a ball transfer groove turned towards the screw.

In accordance with the invention
the mechanism includes a holding body of the recirculation insert, configured for keeping the recirculation insert in the nut housing. The main function of the holding body is to keep the recirculation insert in its housing. The holding body is, for example, an additional part of the mechanism that encloses and supports the nut.

In other respects, and always in accordance with the invention:
the recirculation insert presents a second end with a supporting shoulder on a support area of the nut,
the second end of the recirculation insert includes an orientation lug presenting a predetermined angular position that is fixed relative to the ball transfer groove.

The orientation lug cooperates with at least one guiding relief of the holding body to set an orientation of the recirculation insert in the bearing housing. The orientation of the recirculation insert in the bearing housing is set in such a manner that the transfer groove is adjusted to the raceway.

The ball screw-nut mechanism may include in particular a plurality of recirculation inserts received in a plurality of cylindrical housings, respectively.

The screw of the ball screw-nut mechanism can present a spiral thread in the form of a throat or groove with a circular or ogival profile. The thread of the screw is matched by an internal thread of the facing nut. Preferably the two threads present the same profile and have an identical pitch, they constitute a raceway which receives a plurality of balls. The balls are capable of circulating, virtually without friction, in the raceway, during the relative rotation between the screw and the nut. As indicated in the introductory part, the balls transmit in this raceway the stress of the movement between the screw and the nut.

The first end of each recirculation insert presents a ball transfer groove modifying locally the path of the latter. The transfer groove makes the balls circulate above the thread of the screw in order to return them upstream of the raceway. This defines a cyclical path of the balls. The insert can be adapted to the recirculation over several revolutions of the raceway. Preferably recirculation is however done over a single revolution.

Proper functioning of recirculation requires precise positioning in the height of the insert. It also requires precise orientation of the recirculation insert in its housing so that the transfer groove can accompany the balls in their change of path from the raceway with a minimum of constraints. The recirculation insert plays in fact a part in the extraction of the balls from the raceway at a first end of the transfer groove. The recirculation insert forces the balls to disengage from the raceway and to pass above the thread of the screw, across the transfer groove. The balls rejoin the raceway at the second end of the transfer groove and behind the site of their extraction. In cyclical fashion the balls run through the raceway and the transfer groove, as long as the relative motion between the screw and the nut is not reversed. In case of reversing the direction of the relative motion, for example in case of reversing the rotational direction of the screw, the balls cover their cyclical path in the inverse direction. The exit end of the transfer groove then becomes the entrance end which extracts the balls from the raceway. During their travel, the balls exert stress on the recirculation insert, stress which is directed in the alignment of the raceway, and especially when they arrive at the first end of the transfer groove, i.e. the entrance end. The balls also exert radial stress on the insert in its housing, from the interior of the nut towards the exterior of the nut.

Radial stress is transmitted to the holding body of the recirculation inserts. This body does in fact prevent the recirculation inserts from moving out of their bearing housing towards the exterior of the nut.

The raceway of each ball can include one or several revolutions, although a raceway on a single revolution is preferred. Thus, the nut can preferably include a plurality of recirculation inserts seated in as many housings. The number of recirculation inserts is adapted to the length of the nut and to the number of balls necessary for proper functioning of the screw-nut assembly.

The recirculation inserts and their housings are preferably distributed in uniform angular fashion around the nut in order to distribute symmetrically the forces of stress of the balls as they pass through the transfer grooves. Thus, the holding body can also feature a plurality of guide reliefs, in a uniform angular distribution, cooperating with a plurality of orientation lugs of the recirculation inserts.

In such a configuration, the recirculation inserts can be spaced axially with respect to a distance corresponding to a ball revolution in the raceway or to a multiple of the number of ball revolutions.

The height positioning of each recirculation insert is secured by its shoulder which rests on a supporting area of the nut. The shoulder may be formed by the orientation lug which protrudes radially relative to the body of the insert. The shoulder may also be distinct from the orientation lug.

The support area for the shoulder may simply be the exterior of the nut. It may also be a support area at the bottom of a depression made in the nut around the housing for the insert, Thus, height positioning of the insert is indexed relative to the outside of the nut or relative to the bottom of the depression. The height of the insert in its housing and the length of the insert body allow precise setting of the radial position of the transfer groove relative to the raceway, and in particular relative to the thread of the nut.

It is useful to note in this respect that the housing which extends from the outside of the nut to the thread of the nut is preferably a radial housing for reasons of easier machining. The depression formed around the housing can be a spot face extending into the thickness of the nut and receiving the insert shoulder. It allows limiting or avoiding any protrusion from the insert relative to the nut, except for the lug.

As mentioned above, orientation of the transfer groove relative to the ball raceway is set by the orientation lug in cooperation with the guide relief associated with the holding body. The holding body, received on an exterior face of the nut, may advantageously include several guide reliefs cooperating with several orientation lugs present on the exterior of the nut. In effect, and as mentioned above, the mechanism includes preferably a plurality of recirculation inserts, and each insert is provided with an orientation lug.

The orientation lug of the insert is received, guided and oriented by the relief of the holding body. Consequently, this allows orientation of the recirculation insert and its transfer groove, thanks to the rotational freedom of the insert in its housing. The guide relief and the lug preferably present complementary shapes. For example, the relief may present itself in the form of one or several ribs on which can slide a complementary indentation of the orientation lug. Inversely, the orientation lug may also present itself in the form of a small rail which slides in a relief of the holding body in the form of a depressed guide groove. The orientation lug locks the rotation of the recirculation insert when it is engaged in the groove or the corresponding rib of the holding body.

Orientation of the guide relief is set relative to the holding body, and the position of the holding body on the nut is predetermined by the external face of the nut which receives the holding body and on which the holding body is fitted. In other respects, the orientation lug and the transfer groove are set on the recirculation insert, and are preferably formed in a single piece with the body of the recirculation insert. Thus, the relative orientation of the transfer groove can be set by adjusting one or several parameters such as orientation of the guide relief, orientation of the lug relative to the body of the insert and orientation of the transfer groove on the body of the insert. The guide relief of the holding body is preferably chosen parallel to the axis of the screw and of the nut, for reasons of ease of assembly.

Orientation of the transfer groove is preferably determined at the time of manufacture of the insert. In effect, the insert can be produced from a metal or plastic molding. In this way fixation of the orientation relative to the transfer groove, and/or that of the orientation lug, is done by molding and is especially easy.

Another function of the holding body is to cooperate with the upper face of the recirculation insert which may be formed by the upper face of the orientation lug. In effect, and as mentioned above, the holding body rests on the recirculation inserts to prevent them from leaving their housing under the effect of the constraints exerted by the balls. This holding action, combined with the support of the shoulder on the nut, ensures precise positioning in the height of the recirculation insert in its housing and thereby the height of the transfer groove relative to the raceway of the balls and of the screw.

When the shoulder of the recirculation insert protrudes on the exterior of the nut, the holding body may also present grooves or clearances enabling the passage of the protruding part of the shoulder.

According to a preferred mode of implementation the lug can directly form the shoulder. It is, for example, a rail which protrudes on the body of the recirculation insert, and its protruding part rests on the exterior face of the nut when the body of the recirculation insert is introduced in its housing.

Although other forms can be retained, the recirculation insert preferably presents a body of a generally cylindrical shape than can be introduced with reduced play in the housing. The insert can rotate freely in the housing when the lug is not engaged.

According to a particular implementation of the recirculation insert it may also present at least one tab, and preferably two symmetric tabs provided in proximity of the ball transfer groove. The tabs extend into the raceway in the direction of the screw. They each present a stop edge forming a barrier to the circulation of the balls in the raceway so that the balls moving in the raceway bump against the stop edge. This makes it easier to extract them from the raceway and to route them towards the transfer groove. The tabs constitute an extension of the edges of the transfer groove.

Although the tabs extend into the raceway far enough to collect the balls, they are preferably designed not to completely occupy the raceway. It is in fact preferable that the tabs do not come into contact with the screw, so as to avoid any friction degrading the performance of the screw-nut system.

When the loads supported by the screw-nut mechanism are significant, the balls also exert significant stress on the stop edges of the tabs. In order to better contain this stress, the tabs may present a stiffener opposite to the stop edge of the balls, the stiffener protruding radially on the body of the recirculation insert and extending into the raceway.

The extension into the raceway allows increasing the volume of the stiffener and thereby its capability to strengthen the tab. The stiffener or at least the portion of the stiffener which extends into the raceway is also designed to not completely occupy the raceway so as not to generate any friction and so as not to hinder the orientation of the recirculation insert.

The recirculation insert can feature at least one hollowing or a slot of radial retraction of the tab or tabs. Radial retraction of the tab means a movement that displaces the tab in direction of the axis of the recirculation insert so that the tab and in particular the stiffener mentioned above, no longer constitute an obstacle to the introduction of the recirculation insert into its cylindrical housing. To this effect the tab can be connected to the body of the insert in a flexible manner with an amplitude of flexion in the direction of the retraction hollowing, equal to or slightly superior to a length of the protruding stiffener, so as to retract it completely.

The possibility of radial retraction of the tabs, and in particular of their protruding stiffener makes it easier to introduce the recirculation insert into its cylindrical housing while maintaining an adjustment of the body of the insert on the diameter of the housing. It also allows retaining the possibility of rotation of the insert body in the housing before the orientation lug blocks the rotation. The flexible nature of the link between the tab and the insert body enables the stiffeners to extend themselves automatically in the raceway as soon as the recirculation insert is in place.

The hollowing out for retraction is for example a bisecting slot of the insert, extending from the first end, i.e. the end holding the transfer groove, in the direction of the second end holding the lug. The retraction slot extends over a portion of the height of the insert. In a particular implementation of the insert, the retraction slot passes through the transfer groove and forms two symmetric legs which each hold one tab. The height of the slot determines the length of the legs which is adjusted to obtain the flexibility needed for retraction of the tabs. The retraction slot presents a width inferior to the diameter of the balls to prevent the balls from getting stuck there or entering it.

Flexing legs can be provided to link the tabs to the body of the recirculation insert in order to promote radial retraction of the tabs.

In one of its main applications, the invention concerns a portable electric tool such as pruning scissors or plate shears including a moving blade, a rotary motor, a moving drive part of the moving blade, driven by the motor, and a ball screw-nut mechanism as described. The nut of the ball screw-nut mechanism is connected to the mobile drive element of the blade and the screw is connected to the motor. The holding body can be a plastic or metal ring fitted on the nut. It may also be constituted by a drive element of the nut, by a motor assembly or a geared motor, or by a fixed component linked to the structure of the tool incorporating the screw-nut system. When the holding body is attached or linked to the structure of the tool, the ball nut can be built with a possibility of sliding in the holding body during the operation of the screw-nut system. In that case the orientation lugs can be designed to slide as well relative to the reliefs of the holding body.

The screw of the ball screw-nut mechanism may constitute an extension of the motor shaft or may be connected to the motor shaft through the intermediary of a gear or an appropriate coupling mechanism.

BRIEF DESCRIPTION OF THE SEVERAL VIEWS OF THE DRAWINGS

The above aims, characteristics and advantages and still more, will become clearer in the description which follows and the drawings in which.

DETAILED DESCRIPTION OF THE INVENTION

Reference is made to the drawings to describe an interesting, although by no means limiting example of implementation of a ball screw-nut mechanism in accordance with the invention.

Identical or similar portions of the various figures are marked with the same reference signs so that one can refer from one figure to another. The various figures are shown in free-scale.

Figure 1:
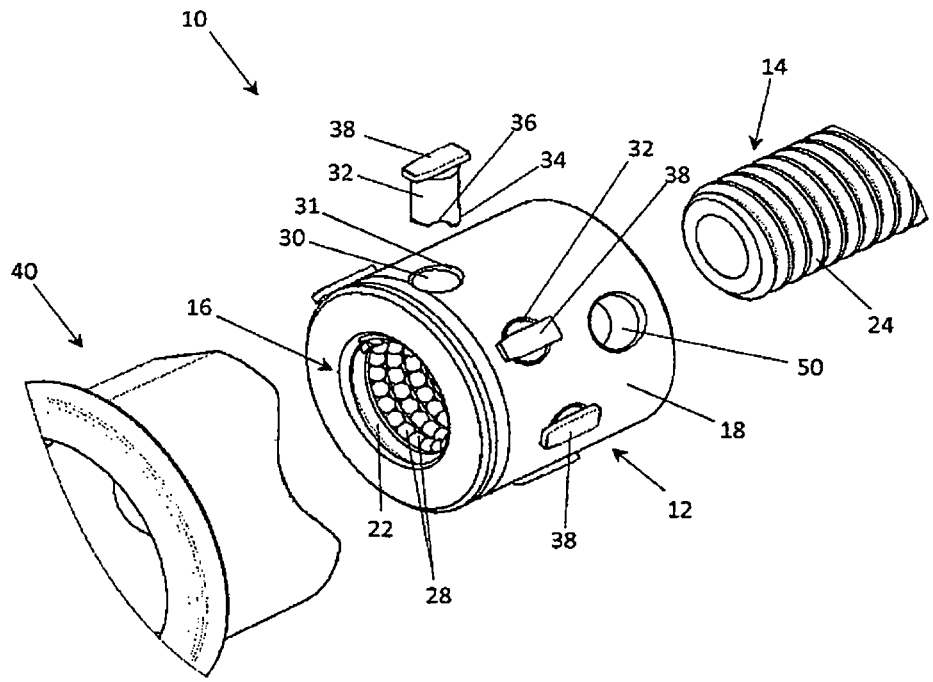
FIG. 1 is an exploded view of a ball screw-nut mechanism in accordance with the invention.

The ball screw-nut mechanism 10 of FIG. 1 includes a nut 12, received on screw 14. The nut and the screw are preferably made of metal. When the screw and the nut are assembled, the screw enters into a tapped hole 16 of the nut 12 provided with an interior thread 22. The interior thread of the nut 12 is better visible on FIGS. 5 and 7. The pitch of the interior thread 22 of the nut corresponds to the pitch of a thread 24 made on the screw. When the nut 12 and the screw 14 are assembled, the threads 22 and 24 are mutually opposite and form a raceway 26, visible on FIGS. 6, 8 and 9. The raceway receives a plurality of balls 28. The balls 28, the diameter of which is adapted to that of the threads, keep the nut in a concentric position on the screw when the screw and the nut are assembled. They transmit the stresses of the movement of the screw towards the nut and reciprocally. The balls are preferably made of steel. The rotation of the screw 14 may be clockwise or counter-clockwise resulting either in a translation of the nut 12 in one direction or the other, along the axis of the screw.

In the implementation shown the nut presents an exterior cylindrical surface 18. It is noted that the exterior surface is not necessarily cylindrical. The nut can in effect present other shapes, for example a hexagonal shape.

A plurality of seats 30, in the form of radial bores are made in the nut 12, with a uniform angular distribution. The bore holes present a chamfer 31. The housings 30 traverse the nut from the exterior face 18 to the interior thread 22.

Figure 7:
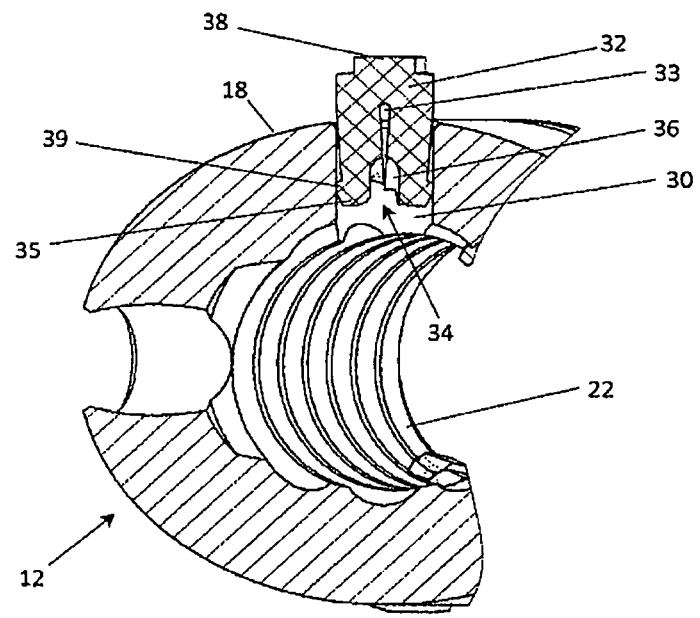
FIG. 7 is a cross section of a portion of the nut showing a detail of the positioning of a recirculation insert.
Figure 8:
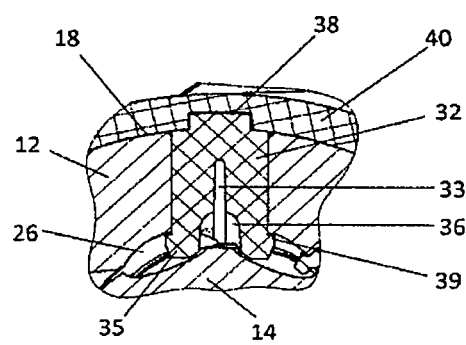
FIG. 8 is a cross section of a portion of the ball screw-nut mechanism around a recirculation insert.
Figure 10:
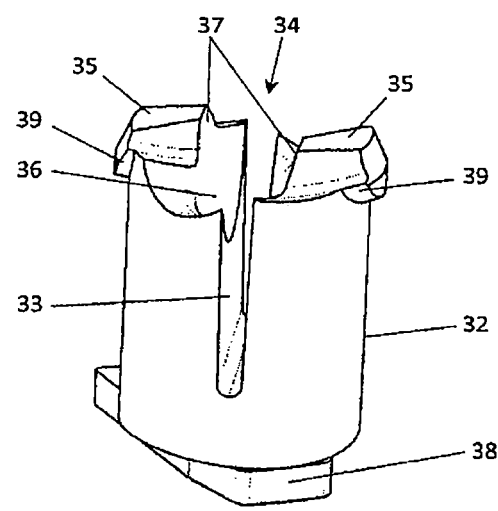
FIG. 10 is a perspective view of a recirculation insert.
Figure 11:
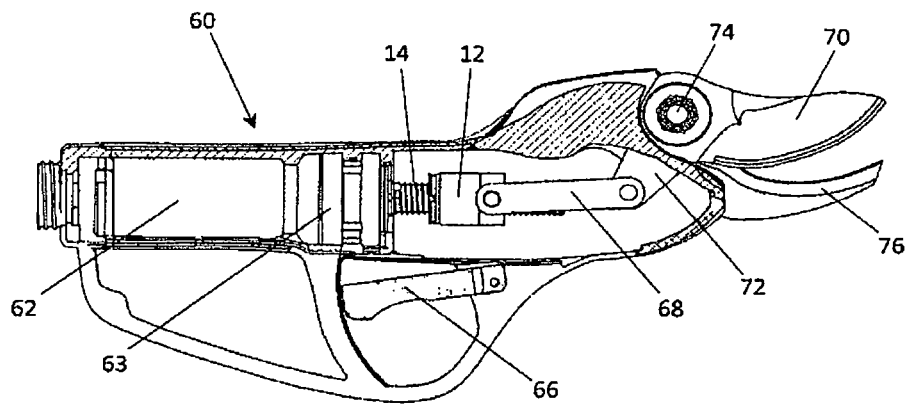
FIG. 11 is a partial section of an electric pruning shear using the ball screw-nut mechanism in accordance with the invention.

Each seat 30 is meant to receive a recirculation insert 32. As shown in FIGS. 1, 7 and 10 and in the particular example described, the inserts 32 present a general cylindrical shape with a first end 34 turned towards the screw 14, and provided with a transfer groove 36. A second end, opposite the first end, is provided with an orientation lug 38. The recirculation insert, and the orientation lug, formed preferably of a single piece, may consist of metal or plastic material. FIG. 8 shows that the recirculation insert is received with reduced play in its seat.

FIGS. 1, 3, 4, 5 and 6 show that the orientation lug 38 forms a shoulder which rests on a support area of the nut. In the example shown in FIGS. 1 to 6, the support area is formed by the exterior face 18 of the nut. The shoulder support permits fixing the extension of the recirculation insert in the housings 30. As FIGS. 5 to 8 also show, the length of the recirculation inserts is set so that the transfer groove 36 connects itself to the raceway 26 of the balls when the shoulder formed by the lug 38 rests on the supporting area of the nut.

Figure 5:
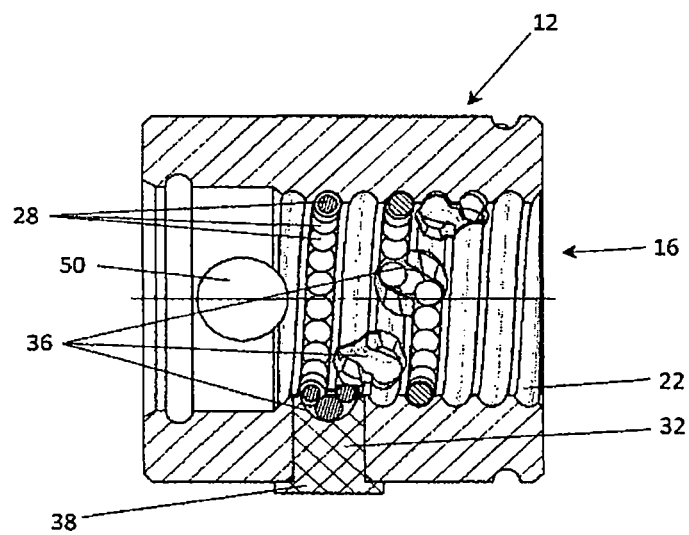
FIG. 5 is a longitudinal section of the nut of FIG. 3 illustrating the recirculation of the balls.

A transfer groove 36 of the recirculation inserts is better visible on FIG. 5 which shows the recirculation of the balls 28. FIG. 5 is a section view of the nut 12 in which the screw has been removed. It shows in particular the end of four recirculation inserts in position in the nut. For the sake of clarity, the screw has been removed and the balls are only shown for two balls paths in the raceway. One can see that the balls 28 pass through the transfer groove 36 of the recirculation inserts of a row in the raceway 26, or of a row of the thread 22 of the nut, to the following or preceding row, depending on the sense of rotation.

Figure 6:
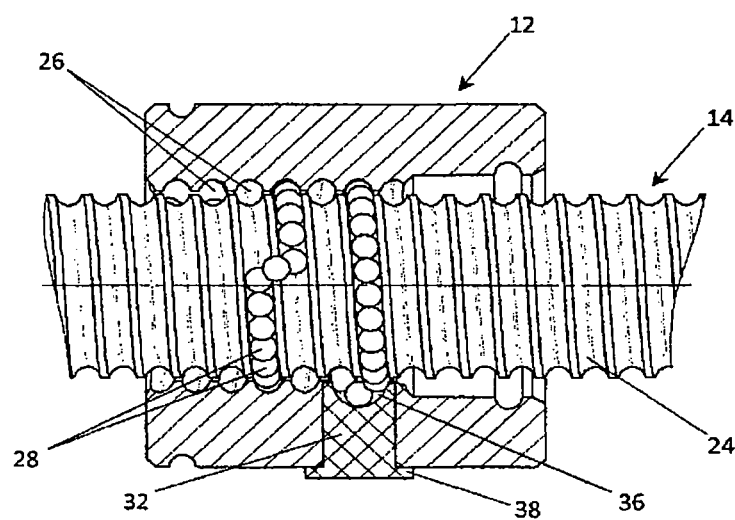
FIG. 6 is a longitudinal section of the nut of FIG. 3 equipped with the screw of the ball screw-nut mechanism.

Recirculation of the balls is also shown in FIG. 6 which is a cross-section of the nut 12 in which passes the non-sectioned screw 14. It is possible to observe that the balls travel along a raceway 26 which goes, respectively, from one row of threads of the screw and the nut to the next row. The balls 28 are then extracted from the raceway by the recirculation insert and pass into the transfer groove 36 of the recirculation insert, above the thread 24 of the screw 14. The balls are then reintroduced into the raceway 26 at the preceding or following row of the thread, depending on the sense of rotation. The two ball paths shown use a first recirculation insert upstream of the section plane which is not shown, and a second recirculation insert positioned in the cutting plane. The balls are not shown in the other paths, for the sake of clarity.

Returning to FIG. 1, it is possible to note that the ball screw-nut mechanism presents a holding body 40, preferably made of plastic, for the purpose of capping the nut 12. The holding body presents itself more exactly like a sleeve coming into contact with the exterior face 18 of the nut. In the example shown, where the nut 12 is of a general cylindrical shape, with a diameter adjusted to that of the nut. Other complementary shapes of the nut and the holding body may be envisaged.

Figure 3:
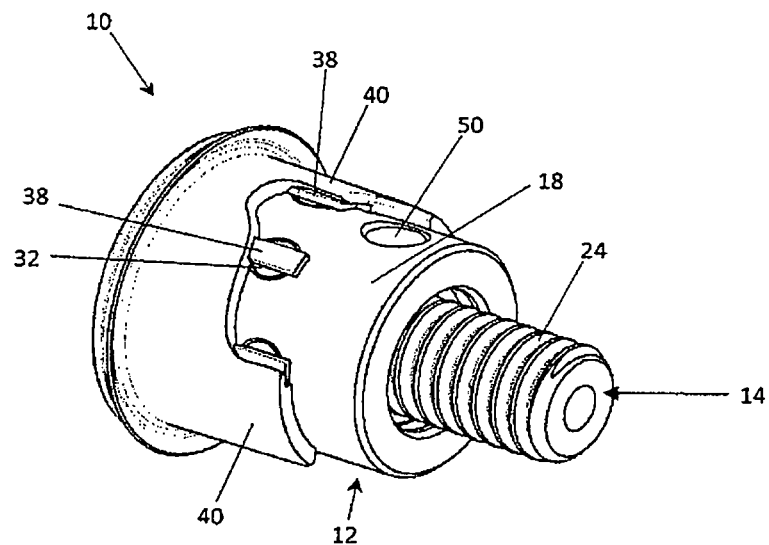
FIG. 3 is a partial cutaway drawing showing the assembly of the ball screw-nut mechanism.

As FIG. 3 shows, an essential function of the holding body is to keep the recirculation inserts 32 in their housings. The holding body rests in effect on the recirculation inserts 32 so as to press their shoulder against the nut.

Figure 2:
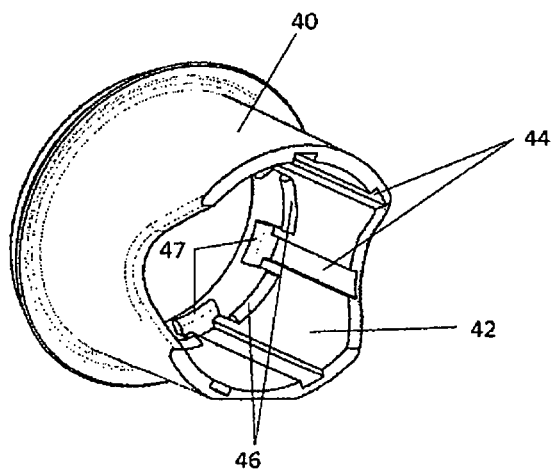
FIG. 2 is a perspective view of a holding body of the ball screw-nut mechanism of FIG. 1.

FIG. 2 shows that the interior face of the bore 42 of the holding body 40 presents the guide reliefs 44. These are, in the example shown, grooves which extend in parallel to the axis of the bore.

The guide relief 44 presents a complementary shape to the orientation lugs 38. In the example shown, the orientation lugs present an oblong shape and the grooves of the guide relief have a width that corresponds to that of the lugs.

FIG. 3 shows the assembled mechanism of FIG. 1. The nut 12 is inserted in the holding body 40. It is possible to observe that the orientation lugs 38 are received and oriented in the grooves of the guide relief 44. This corresponds to the second function of the holding body which is to set and maintain the orientation of the recirculation inserts. The precise orientation of the recirculation inserts is essential because it permits adjusting the orientation of the transfer groove in relation to the ball race. A guide relief can be provided for each recirculation insert. It is also possible to envisage that a same guide relief cooperates with the lugs of several recirculation inserts aligned along the axis of the nut. It is possible to observe on FIGS. 1 and 4 that the orientation lugs 38 present a slightly tapered end. This makes it possible to summarily locate the orientation of the recirculation inserts at the time of their placement in their housings. Furthermore, the slightly tapered end facilitates the introduction of the lugs into the guide relief 44 at the time of the assembly. When the orientation lugs engage on the guide relief, orientation of the inserts adjusts itself automatically on the guide relief thanks to the rotational freedom of the recirculation inserts 32 in their housings 30. On the other hand, once the orientation lugs 38 are engaged with the guide relief, the rotation of the inserts in blocked.

FIGS. 1, 3, 4 and 5 also show a fastening bore hole 50 on the nut 12. The radial bore hole 50 traverses the nut through and through and is not covered by the holding body 40. The bore hole 50 is provided for receiving fastening studs for connecting bars described below in reference to FIG. 1.

Figure 4:
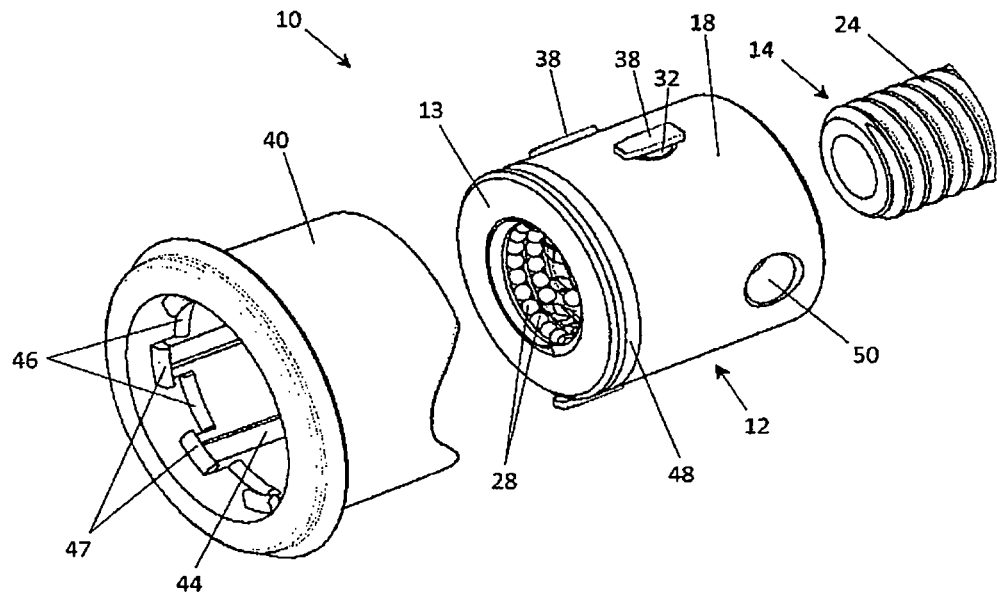
FIG. 4 is an exploded view of the ball screw-nut mechanism.

FIG. 4 shows the ball screw-nut mechanism just before installation of the holding body 40 on the nut 12. All recirculation inserts 32 are in place in their housings. The holding body 40 presents a segmented interior retainer ring, its segments 46 are engaged in a circular throat 48 provided on the exterior face 18 of the nut 12 for keeping the sleeve on the nut. The holding body 40 also presents a segmented shoulder 47 that abuts on a face 13 of the nut, next to the throat 48.

FIG. 10 shows, at a larger scale, a recirculation insert 32 of a general cylindrical shape. It is especially possible to observe the transfer groove 36 on the first end 34 of the insert, and the orientation lug 38 on the opposite end. In the particular implementation of the recirculation insert shown in FIG. 10, the transfer groove is extended by tabs 35. The purpose of the tabs 35 is to protrude into the raceway of the balls in order to stop the balls in circulation and to force them to leave the raceway to continue their path in the transfer groove 36. For this purpose, the tabs each present a ball stop edge indicated by the reference 37.

The ball stop edges 37 and the tabs 35 are subject to sustaining significant amounts of stress. Therefore, the insert 32 in this case presents stiffeners 39 opposite the stop edges 37.

The stiffeners 39 protrude radially on the cylindrical body of the recirculation insert. Also, to prevent the stiffeners 39 from hindering the installation of the recirculation insert in its housing, the insert is provided with a retraction hollowing 33. This is a longitudinal slot which opens into the raceway. The width of the slot is at the same time wide enough to permit the complete radial retraction of the stiffeners and is also sufficiently reduced so that the balls cannot enter. The slot forming the retraction hollowing 33 separates the end of the insert into two parts which constitute the flexion legs.

The retraction of the stiffeners 39 by flexion of the legs mentioned above is shown on FIG. 7. FIG. 7 shows, in cross section, a recirculation insert 32 at the time of its introduction into its housing 30.

When the recirculation insert is completely introduced, i.e. when the shoulder formed by the orientation lug 38 rests against the exterior face 18 of the nut 12, the flexion of the legs is released and the stiffeners place themselves in the raceway 26. It is possible to observe the position of the recirculation insert 32 and of the stiffeners 39 on FIG. 8. FIG. 8 shows in a section view a detail of the nut and of the screw in proximity of a recirculation insert, after its placement in its housing.

Figure 9:
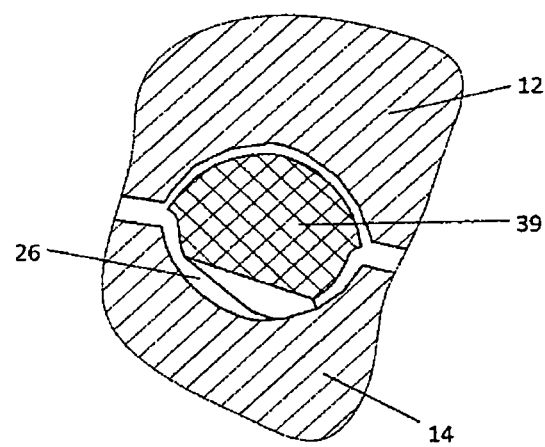
FIG. 9 is a section of a portion of the ball screw-nut mechanism passing through a stiffener of a recirculation insert.

The stiffeners occupy a significant portion of the section of the raceway. However, the stiffeners are sized and held so that they touch neither the screw 14 nor the nut 12. A slight play is maintained in order to avoid any unnecessary friction. This aspect is illustrated by FIG. 9 which is a cross-section of the raceway passing through one of the stiffeners 39.

The ball screw-nut mechanism can be used for various applications. One particular application is shown in FIG. 1. It is an application on an electric pruning shear 60.

The pruning shear is provided with a rotary electric motor 62 and a ball screw-nut mechanism in accordance with the invention to transform a rotational movement of the motor into a translational movement. The motor 62 connected to the screw 14 of the ball screw-nut mechanism through the intermediary of a gear 63 to make the screw 14 turn clockwise or counter-clockwise, depending on a control applied to a trigger 66.

As described previously, the rotation of the screw 14 results in the displacement of the nut 12 parallel to the axis of the screw. The direction of displacement of the nut depends on the sense of rotation of the screw. A mobile drive element 68, for example an articulated rocker bar, is connected to the nut by means of an appropriate fastener, for example studs or pivot pins which are engaged in the fastening bore hole 50 mentioned in reference to FIGS. 1, 3, 4 and 5.

The opposite end of the mobile drive part is linked to a cam 72 of a mobile cam 70. In this manner, the translation movement of the nut 12 is transmitted to the cam and generates the pivoting of the mobile blade 70 around a pivot 74. Depending on the sense of rotation of the screw 14, the mobile blade 70 is raised or dropped on a fixed blade 76.

The invention claimed is:

1. A mechanism comprising:
   a threaded screw;
   a nut cooperating with said threaded screw through an intermediary of balls that circulate in a raceway formed by threads of said threaded screw and threads of said nut, said nut having at least one recirculation insert, the at least one recirculation insert being insertable from an exterior face of said nut toward the threads of said nut, the at least one recirculation insert having a first end with a ball transfer groove turned towards said threaded screw;
   a holding body having a cylindrical housing that retains the at least one recirculation insert in said nut, the at least one recirculation insert having a second end with a supporting shoulder on a supporting area of said nut, the second end having an orientation lug having a predetermined and fixed angular position relative to the ball transfer groove, the orientation lug cooperating with at least one guide relief of said holding body so as to set an orientation of the at least one recirculation insert in the cylindrical housing, the orientation of the at least one recirculation insert being set so as to adjust the ball transfer groove relative to the raceway, the orientation lug being oblong with a length greater than a width thereof, the at least one guide relief having a width corresponding to the width of the orientation lug, the at least one recirculation insert having a circular cylindrical shape between the orientation lug and the ball transfer groove, the at least one recirculation insert being received in a radial bore of said nut.

2. The mechanism of claim 1, wherein the orientation lug forms the supporting shoulder of the at least one recirculation insert.

3. The mechanism of claim 1, wherein the support area is the exterior face of said nut.

4. The mechanism of claim 1, wherein the support area is an indentation around the cylindrical housing.

5. The mechanism of claim 1, wherein the holding body has a bore hole adapted to receive said nut, the at least one guide relief extending parallel to an axis of the bore hole.

6. The mechanism of claim 1, wherein the at least one guide relief is a depressed groove.

7. The mechanism of claim 1, wherein the at least one recirculation insert is a plurality of recirculation inserts housed in a corresponding plurality of the cylindrical housing.

8. The mechanism of claim 7, wherein the holding body has a plurality of the guide reliefs uniformly angularly distributed so as to cooperate with a plurality of the orientation lugs of the plurality of recirculation inserts.

9. The mechanism of claim 8, wherein each of the plurality of the guide reliefs receives the plurality of orientation lugs.

10. The mechanism of claim 1, wherein the at least one recirculation insert comprises a plurality of recirculation inserts distributed angularly around said nut and axially spaced relative to a distance corresponding to multiples of a thread pitch of said nut.

11. The mechanism of claim 1, wherein the at least one recirculation insert has at least one guide tab in proximity to the ball transfer groove and extending into the raceway in a direction of said screw, the at least one guide tab being a stop edge for the balls.

12. The mechanism of claim 11, wherein the at least one guide tab has a stiffener protruding radially outwardly therefrom, the stiffener extending into the raceway.

13. The mechanism of claim 12, wherein the at least one recirculation insert has a hollowing thereon, the at least one guide tab being flexably connected to the at least one recirculation insert so as to have an amplitude of flexion in a direction of the radial extraction equal to a length of the stiffener.

14. A portable power tool having the mechanism of claim 1.

15. The portable power tool of claim 14, wherein said nut is connected to a mobile drive element of a blade and said screw is connected to a motor of the portable power tool.

* * * * *